Sept. 22, 1959     T. S. ZAJAC     2,905,485

VALVED COUPLING

Filed Dec. 18, 1956

INVENTOR.
THEODORE S. ZAJAC
BY

United States Patent Office 2,905,485
Patented Sept. 22, 1959

2,905,485
VALVED COUPLING

Theodore S. Zajac, Parma, Ohio, assignor to Zalo Manufacturing Company, a corporation of Ohio Application December 18, 1956, Serial No. 629,072

7 Claims. (Cl. 284—18)

My invention relates to coupling members of the valved type.

An object of my invention is to provide an improved female coupling adapted to be connected to a male connecting member and having a valve adapted to be opened by insertion of the male connecting member.

Another object is the provision for an improved coupling member having a large capacity for flow or fluid therethrough relative to the outer dimensions of the coupling.

Another object is the provision of an improved construction of a coupling with a movable valve therein arranged to provide maximum fluid flow through the coupling upon opening of the valve in relationship to the outer dimensions of the coupling.

Another object is the provision in a coupling of a valve and mounting therefor which permits maximum flow of fluid through the coupling past and around the valve when the valve is in its open position.

Another object is the provision of a unique construction in a valved coupling providing improved results in a novel manner.

Other objects and a fuller understanding of my invention may be had by referring to the following description and claims, taken in conjunction with the accompanying drawing, in which:

Figure 1:
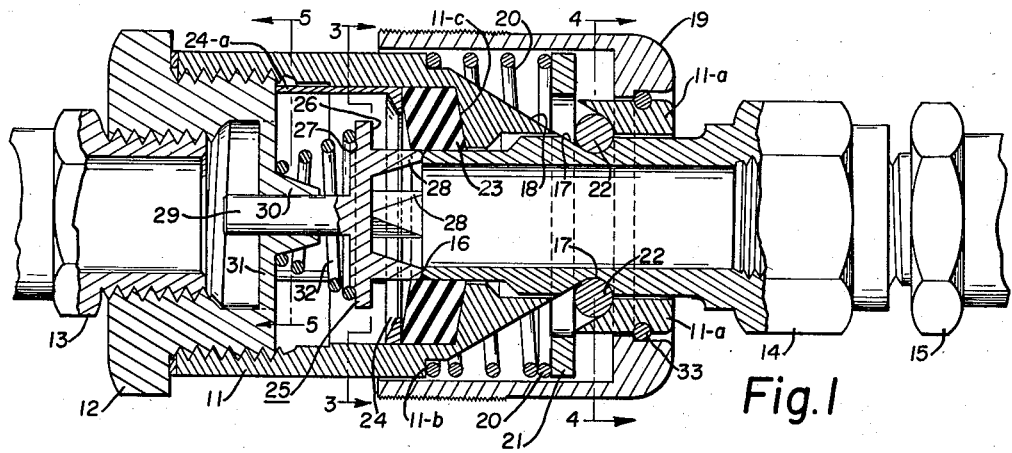
Figure 1 is a longitudinal sectional view of a female coupling embodying my invention and having a male connecting member inserted therein so as to open the valve in the female coupling.

My improved female coupling has a hollow body 11 having an opening extending axially therethrough. A ferrule or end plug 12 is threadably engaged to the rearward end of the body 11, as illustrated. A threaded nipple or connection 13 is threadably connected to the ferrule 12. This nipple or connection 13 is adapted to carry and be connected to the end of a hose or tube. The central opening through the nipple 13 is in axial alignment with the opening extending axially through the body 11.

The forward end of the hollow body 11 is reduced in diameter to provide the reduced end portion 11-a and is adapted to receive a male connecting member 14 in the usual manner. In Figure 1, a male connecting member 14 is shown as fully inserted into the opening within the body 11 of the female coupling. This male connecting member 14 has a threaded nipple or connection 15 threadably engaged thereto for interconnecting a hose or tube to the male connecting member 14. The central opening through the nipple 13 is in axial alignment with an opening extending through the male connecting member 14. The male connecting member 14 has an open end 16 and this provides that there is an axial opening from the extreme outer end of the male connecting member 14 therethrough, this axial opening being defined by an annular wall extending to the open end 16.

There is an annular groove 17 extending around the male connecting member 14 in the usual manner, this groove 17 having one wall at a greater incline than the other wall and having a circular bottom, as illustrated in the drawing. This groove 17 is provided for accommodating locking means of a quick-detachable locking mechanism and is generally of a well-known construction.

The reduced end portion 11-a of the body 11 has provided therein two opposing slantingly disposed slots 18, these slots 18 extending through the wall of the reduced portion 11-a to the central opening extending through the body 11. The slots 18 are generally parallel with each other on opposite sides of the axis of the body 11. These slots 18 are slanted or inclined at an angle to the axis of the body and are inclined toward each other as they extend forwardly toward the end of the reduced portion 11-a of the body.

In each of the slots 18 there is disposed a locking bar 22 of cylindrical shape, these locking bars 22 being adapted to slide forwardly and rearwardly of the body at the slanted incline of the slots 18. When moved radially inward, the bars 22 engage in the groove 17 of the male connecting member 14 so as to interlock the male connecting member 14 with the female coupling body 11. When moved radially outward through the slots 18, the bars 22 move out of the grooves 17 so as to permit withdrawal of the male connecting member 14 from the opening in the body 11.

The bars 22 are resiliently urged forward into locking position by a coil spring 20 which abuts against an annular washer 21 at one end of the spring 20 and which abuts against a shoulder 11-b provided on the body 11. The bias of the coil spring 20 is such as to urge the annular washer 21 forwardly and away from the shoulder 11-b. The opposite ends of each bar 22 are engaged by the annular washer 21 so that the washer 21 presses upon the two bars 22 which are thereby resiliently urged forward and hence radially inward so as to engage in the groove 17 upon a male connecting member 14 being inserted within the female body 11, such as to the position shown in Figure 1.

A sleeve 19 is disposed around the forward end of the body 11 so as to enclose the spring 20, washer 21 and bars 22 therein. The sleeve 19 is held against removal from the body 11 by a split spring ring 33. The mounting of the sleeve 19 is such that it may reciprocate along the body 11. The outer surface of the sleeve 19 has a knurled portion for easy grasping of the sleeve 19. By manually moving the sleeve 19 in an axial direction to the left as in Figures 1 and 2, the forward end wall of the sleeve 19 presses upon the end of the bars 22 and thus against the washer 21 so as to overcome the resilient bias of the spring 20 and this moves the washer 21 sufficiently rearwardly, that is, to the left in Figures 1 and 2. This rearward movement of the sleeve 19 at the same time moves the locking bars 22 rearwardly and hence radially outward to thus disengage from the groove 17 of a male connecting member 14. Upon letting loose of the sleeve 19, the resilient bias of the spring 20 again moves the washer 21 forwardly, that is, to the right in Figures 1 and 2, and thus urges the bars 22 to their forward locking position shown in Figure 1.

It may be noted also that forced insertion of the male connecting member 14 into the open end of the female coupling body 11 and the engagement of the locking bar 22 by the male member 14 initially moves the bars 22 rearwardly and radially outward so as to clear the larger diameter of the male member 14 and thus permit the male member to move into locked engagement with the coupling, as shown in Figure 1, without having to manually move the sleeve 19 rearwardly. In other words, the interlocking of the parts is automatic upon forced insertion of the male member 14 into the female body 11.

Forced insertion of the male connecting member 14 into the body 11 so engages the bars 22 and the bars 22 are momentarily forced radially outward sufficiently to clear the outer wall of the male connecting member 14 forwardly of the groove 17 until the bars 22 are aligned with the groove 17, at which time the bars 22 are resiliently urged radially inward into the groove 17 and thus interlock the male connecting member 14 to the body 11 of the coupling.

There is provided internally of the hollow body 11 an annular shoulder 11–c. This shoulder 11–c is disposed at an incline which is on the order of ten degrees of the axis of the body 11. The incline is such that the annular shoulder 11–c slopes slightly forwardly as it extends radially inward of the body. An annular sealing member 23 of suitable rubber, rubber-like material, or other appropriate sealing composition, is positioned within the body 11 adjacent the shoulder 11–c. This sealing member 23 has a cylindrical opening extending therethrough. In its normal position, the sealing member 23 is slightly inclined so as to complement the inclination of the shoulder 11–c. There is sufficient resiliency and yield to the sealing member 23 that it accommodates itself to pressure of parts moved against it.

To retain the sealing member 23 in position against accidental dislodgement and particularly to hold it in proper location when not otherwise restrained, there is provided a retaining member 24. This retaining member 24 is annular in form so as to engage the sealing member 23 adjacent its outer edge and to hold it in position against the shoulder 11–c. The retaining member 24 has three legs 24–a extending rearwardly from the ring portion thereof, these three spaced legs being in frictional engagement with the inner wall of the body 11. This retaining member 24 may be manually removed from the body 11 when the ferrule 12 is threadably detached. Upon removal of the retaining member 24, then the sealing member 23 is released for removal from the rearward end of the body 11.

Figure 2:
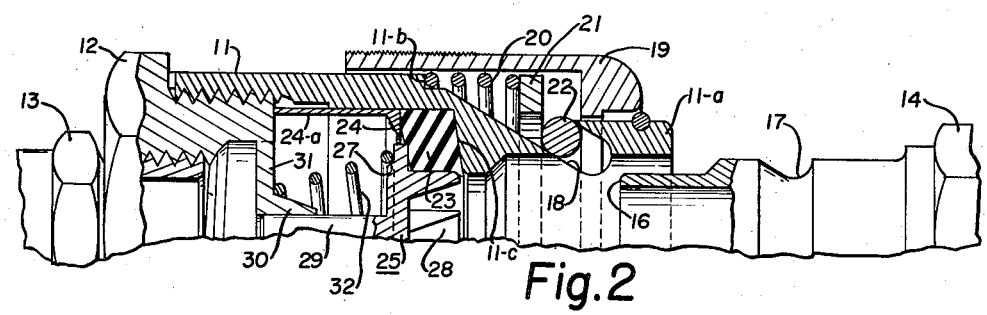
Figure 2 is a partial longitudinal sectional view of a female coupling embodying my invention and having the male connecting member sufficiently withdrawn therefrom so as to provide for the closing of the valve in the female coupling member.
Figure 3:
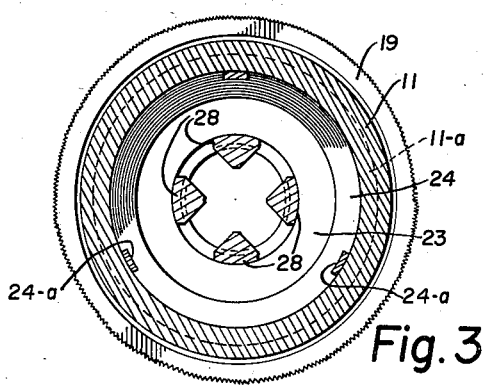
Figure 3 is a cross-sectional view taken through the line 3—3 of Figure 1.
Figure 4:
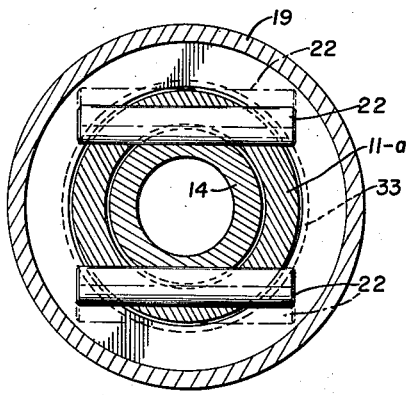
Figure 4 is a cross-sectional view taken through the line 4—4 of Figure 1.

A valve member denoted generally by the reference character 25 is axially disposed within the hollow opening the body 11. This valve member 25 has an annular seating area 26 on the forward face thereof, which seating area 26 is adapted to sealingly abut the sealing member 23 when the valve member 25 is in its closed position, as illustrated in Figure 2. When in the open position of the valve member 25, as illustrated in Figure 1, the annular seating area 26 is sufficiently spaced from the sealing member 23 to provide a large fluid passageway therebetween.

There is a castellated protruding portion 28 extending forwardly of the valve member 25. This protruding portion 28 is made up of four separated prongs or fingers arranged parallel to the axis of the valve member 25. The outer wall of the castellated protruding portion 28 (in four spaced parts) has a diameter complementing the inner diameter of the cylindrical opening through the sealing member 23. This castellated protruding portion 28 moves through the cylindrical opening in the sealing member 23 as the valve member 25 reciprocates. In the open position illustrated in Figure 1, the castellated protruding portion 28 is partially but not entirely withdrawn from the opening in the sealing member 23. In the closed position of Figure 2, the castellated protruding portion 28 is moved entirely into the opening in the sealing member 23.

It is to be noted that by reason of the relatively large spaces provided between the four prongs or fingers of the castellated protruding portion 28, there is a relatively large fluid passageway, in four divisions, provided through the protruding portion 28. Thus, in the open position of Figure 1, there is a relatively large passageway through the castellated protruding portion 28 between the cylindrical opening through the sealing member 23 and the interior of the body 11 rearwardly of the valve member 25.

This castellated protruding portion 28 provides means for the engagement of the valve member 25 by the forward end 16 of the male connecting member 14. Upon forced insertion of the male connection member 14 into the body 11, the end 16 of the male connecting member 14 engages the forward end of the castellated protruding portion 28 and continued insertion of the male connecting member 14 into the body 11 forces the valve member 25 to its open position shown in Figure 1. Thus, while the protruding portion 28 provides means for engaging the forward end of the male connecting member, there is no undue restriction or limitation on the fluid passageway between the valve member 25 and the sealing member 23.

There is disposed on the rearward side of the valve member 25, opposite from the seating area 26, an annular shoulder 27, this shoulder 27 being spaced radially inward from the maximum peripheral extent of the valve member 25. Also extending rearwardly of the valve member 25 is a stem portion 29 of generally cylindrical shape. This stem portion 29 is disposed axially of the valve member 25.

Figure 5:
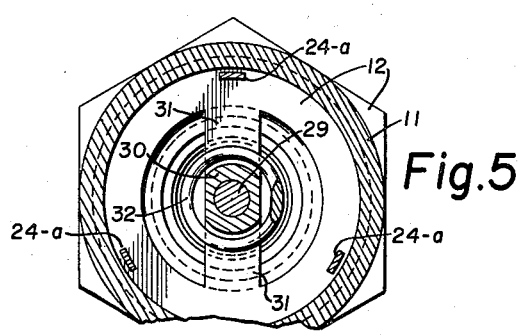
Figure 5 is a cross-sectional view taken through the line 5—5 of Figure 1.

To support and slidably guide the stem portion 29, a guide sleeve 30 is positioned within the opening of the body 11. This guide sleeve 30 has an axially extending opening complementing the outer cylindrical wall of the stem portion 29 of the valve member. To support the guide sleeve 30 in proper axial position within the opening in the body 11, there is a supporting arm 31 which is integrally formed with the ferrule 12 connected to the rearward end of the body 11. This supporting arm 31 extends diametrically across the opening in the body 11. The arrangement of the supporting arm 31 is such that there is a relatively large space on opposite sides thereof so as to maintain a relatively large fluid passageway through the body 11, the open area, as seen in Figure 5, being considerably greater than the area occupied by the supporting arm 31 and the guide sleeve 30. Thus, the relatively large capacity passageway through the body 11 is maintained by the disposition of the parts. The guide sleeve 30 has an outer wall of frusto-conical shape as it extends forwardly from the supporting arm 31, such as seen in the drawing.

A compression coil spring 32 of general frusto-conical shape is positioned around the stem 29 and between the supporting arm 31 and the valve member 25. The larger end of the spring 32 is concentric with the valve member 25 and is centered in respect to the axis of the valve member 25 by the annular shoulder 27. The smaller end of the coil spring 32 is positioned around the outer wall of the guide sleeve 30 and next adjacent to the supporting arm 31. By this arrangement, the coil spring 32 is held concentric with the valve member 25. The resilient bias of the spring 32 is such as to resiliently urge the valve member 25 to its closed position, that is, toward the right in Figures 1 and 2. The bias of the spring 32 is such that it may be resiliently overcome by a male connecting member engaging the protruding portion 28 of the valve member 25 and pushing the valve member rearwardly, such as to its position illustrated in Figure 1. It is to be noted that when in this compressed condition, as shown in Figure 1, the individual loops or coils of the spring 32 are moved relatively close to each other. When in the more expanded position illustrated in Figure 2, the individual loops or coils of the spring 32 are moved farther apart from each other. It is to be noted, however, that by the shape and arrangement of the spring 32 and the particular mounting therefor here described, the compression of the spring does not tend to restrict or close off the fluid passageway through the body. There is no more restriction or limitation upon the fluid passageway extending through the body when the spring is compressed as in Figure 1 than when it is relatively expanded as in Figure 2. In other arrangements and prior constructions, this advantage is not found and compression of a valve-operating spring tends to restrict and close off the fluid passageway. My valve-operating spring is positioned generally out of the direct path of the fluid and the compression does not provide for restriction of the fluid passageway otherwise obtained.

By the unique arrangement and construction of parts here described, I have been able to provide a valved coupling which gives markedly increased fluid flow capacity relative to the outer dimensions of the coupling. The valving is quick-acting and a positive closing operation is obtained. It is to be noted that upon insertion of the forward end of the male connecting member, there is a good seal provided by the sealing member 23 and the outer forward wall of the male connecting member, the sealing member 23 tending to tilt slightly radially inward by its frictional engagement with the outer forward wall of the male member 14. This inclination of the sealing member in respect to the inward movement of the male connecting member tends to increase the sealing engagement between the outer wall of the male connecting member and the wall of the opening through the sealing member 23.

The structure illustrated and described has provided an efficient coupling giving superior results and filling a long-felt need in valve couplings handling fluids, both liquid and gaseous.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a female coupling member adapted to receive and detachably couple with an open-ended male connecting member having a cylindrical forward end portion terminating in an annular end wall, said coupling member having a cavity for accommodatnig flow of fluid therethrough, an anular resilient sealing member positioned in said cavity, said sealing member having a cylindrical bore adapted to receive and sealingly engage the outer cylindrical end portion of said male connecting member, said sealing member also having an annular sealing surface concentric with said bore and disposed at an angle to the axis thereof, said coupling member having an annular shoulder inclined to a transverse plane disposed normal to the axis of said coupling member, said sealing member being inclined to the said plane to engage said annular shoulder, the said sealing member upon receiving a said male connecting member in the cylindrical bore thereof being resiliently tiltable in a direction away from said shoulder by frictional engagement with the male connecting member inserted into said cylindrical bore to increase the sealing engagement with the male connecting member, a valve member disposed axially of said bore and having a body portion adapted to close said bore upon axial movement of said valve member to closed position, said valve member having an annular sealing area disposed around said body portion at an angle to said bore and adapted to sealingly engage said sealing surface of the sealing member in the closed position of said valve member, said valve member having an actuating portion protruding from said body portion and disposed parallel to and at a radial distance from the axis of said bore, said actuating portion being disposed in alignment with said bore and movable therein to engage the said annular end wall of said male connecting member, insertion of a male connecting member in the sealing member to engage the actuating portion causing the valve member to move to open position, said actuating portion having open spaces extending radially therethrough to accommodate radial flow of fluid between said sealing member and the annular sealing area of the valve member upon axial movement of the valve member to an open position separating said annular sealing area of the valve member from said annular sealing surface of the sealing member, said valve member having a stem extending along the axis thereof in a direction away from said sealing member, a guiding member having an opening extending along said axis and slidably receiving said stem to guide said valve member in movement along said axis relative to said sealing member, said coupling member having a radially extending supporting portion carried thereby for supporting said guiding member in said cavity, said supporting portion having an opening extending therethrough longitudinally of the coupling to permit fluid to flow through the cavity past the guiding member and support portion, said guiding member having an outer wall extending longitudinally of the coupling from said supporting portion, and a coil spring wound in frusto-conical form having its smaller end disposed around said guiding member and abutting said supporting portion, said coil spring having its larger end disposed concentrically about said stem and abutting said body of the valve member, the said coil spring being biased to resiliently urge said valve member away from said supporting portion toward closed position, said valve member being movable to open position against the resilient bias of the said coil spring by movement of a male connecting member into said bore and against said actuating portion of the valve member, the moving of the valve member to open position compressing the coil spring around said guiding member and stem toward the smaller end of the coil spring.

2. In a female coupling member adapted to receive and couple with an open-ended male connecting member, said coupling member comprising a hollow body having a longitudinal opening extending therethrough, an annular resilient sealing member having a bore disposed axially of said hollow body, said coupling member having an annular shoulder inclined to a transverse plane disposed normal to the axis of said coupling member, said sealing member being inclined to the said plane to engage said annular shoulder, the said sealing member upon receiving a said male connecting member in the cylindrical bore thereof being resiliently tiltable in a direction away from said shoulder by frictional engagement with the male connecting member inserted into said cylindrical bore to increase the sealing engagement with the male connecting member, a valve member movable axially in said body relative to said sealing member to open and close said bore, said valve member having an annular sealing surface extending radially thereof and adapted to abut said sealing member in the closed position of said valve, said valve member having an annular shoulder disposed on a side opposite of said sealing surface and spaced radially inward of the outer peripheral edge of the valve body, said valve member having a castellated protruding portion extending from the plane of said sealing surface toward and in alignment with said bore, said protruding portion being movable in said bore upon axial movement of the valve member to open and closed positions and being adapted to engage the end of a said male member inserted into the said hollow body in axial alignment with said bore, said valve body being movable to open position by movement of a said male connecting member inwardly of the hollow member against said protruding portion, said valve body having a stem portion extending axially thereof in a direction away from said castellated protruding portion, said hollow body having a guiding sleeve portion slidably receiving said stem portion to guide the valve member in a movement axial of the hollow body to open and closed positions, said hollow body having a supporting portion extending radially of said hollow body athwart said longitudinal opening to support said sleeve portion at the axis of said body, said supporting portion having an opening extending therethrough to permit fluid flow through the longitudinal opening past the supporting portion, and a conically formed coil spring positioned in said hollow body, said coil spring having its smaller end disposed about said sleeve member and anchored in an axial direction by said supporting portion and having its larger end disposed about said shoulder of the valve member and anchored in an axial direction by said valve member, said spring being biased to urge said valve member toward closed position, said coil spring being compressed toward its smaller end upon the valve member being moved to open position in a direction away from the sealing member by a said male member.

3. In a female coupling adapted to receive an open-ended male connecting member, a hollow member having a central opening extending axially thereof for accommodating the flow of fluid therethrough, an annular resilient valve seat member axially disposed in said central opening, a valve member positioned in the hollow member and movable in an axial direction relative to the valve seat member to control flow of fluid through the hollow body, said female coupling having an annular shoulder inclined to a transverse plane disposed normal to the axis of said female coupling, said seat member being biased to be normally inclined to said plane to engage said annular shoulder, the said seat member upon being engaged by a said male connecting member inserted in said female coupling member receiving the male connecting member in the bore of the seat member and being frictionally engaged by the male connecting member to resiliently tilt toward said plane and to increase sealing engagement with the male connecting member, said valve member having a body portion adapted to engage said seat and a stem portion extending axially of said body portion in a direction away from said seat, a guiding member carried by said hollow member and having an axially extending open space slidably receiving said stem portion to guide movement of said valve member in an axial direction, said guiding member having openings therethrough to permit fluid to flow through the hollow member past the guiding member, said guiding member being positioned at an axial distance from said seat and athwart said central opening, and a helical compression coil spring in frusto-conical form having its smaller end carried by said guiding member and its larger end carried by said valve body, said larger end being not substantially greater in radial extent that the said valve body, said spring being biased to urge said valve member toward said seat, compression of said spring in opposition to said bias moving the coil loops thereof toward a common plane and diminishing the space between the coil loops, said central opening being substantially greater in radial extent than the said valve body and than said larger end of the coil spring to permit flow of fluid through the said central opening in a path radially outward of the valve body and the larger end of the coil spring.

4. In a valved female coupling, a body member having a round opening extending therethrough between a first end and a second end, said body member being adapted to receive through said first end an open ended male member, an annular resilient sealing member mounted in said body member intermediate the ends thereof, said sealing member having an opening therethrough disposed axially of the body member and providing communication through the said body member, said sealing member being normally inclined at an angle to the axis of the body member toward said first end, a valve member positioned in said body member and disposed adjacent a side of said sealing member directed toward said second end, said valve member having an annular seating area adapted to sealingly engage said sealing member in the closed position of the valve member, said valve member having an annular shoulder portion disposed radially inward from its outer periphery and directed toward said second end, said valve member having a protruding portion extending toward said first end and into the opening of said sealing member adjacent the wall of said opening, said protruding portion being engageable by a said open-ended male member to move the valve member toward said second end upon insertion of a said male member into the opening of said sealing member, said sealing member being tiltable toward said second end by said male member to increase the sealing engagement between the male member and sealing member, said protruding portion being open in a radial direction to permit fluid to flow radially between said sealing member and said seating area in the open position of said valve member, said valve member having a stem portion extending axially thereof toward said second end, a ferrule member threadably engaged to said body member at said second end thereof, said ferrule member having an opening therethrough axially aligned with the opening in said body member, a guide sleeve slidably receiving said stem portion to guide said valve member in reciprocal movement axially of the body member to open and closed positions, said ferrule member having a supporting portion extending radially thereof to support said guide sleeve in said body member in axial alignment therewith, said supporting portion having an opening extending therethrough to permit the flow of fluid through the ferrule member past the supporting portion, a coil compression spring in frusto-conical form having its smaller end disposed around said guide sleeve and urged toward said supporting portion, said spring having its larger end disposed around said shoulder portion of the valve member, said coil spring upon movement of the valve member toward open position by a said male member pressing on said protruding portion toward said second end resiliently opposing movement of the valve member to open position, said coil spring upon compression being compressed into an area radially inward from the outer periphery of said valve member, and a retaining member positioned between the ferrule member and the sealing member for retaining the sealing member in said body member, said retaining member having portions frictionally engaging the wall of the body member to maintain its position upon removal of the ferrule member.

5. In a coupling member adapted to receive and couple with a male connecting member, the combination of a hollow body having a central opening extending therethrough, an annular sealing member of resilient rubber-like material positioned axially in said body, said sealing member having an axially extending cylindrical bore therethrough providing a communication through said body, said sealing member being cupped to extend axially thereof at an incline toward a first end of the said body and resiliently urgeable toward a flat plane to resiliently diminish said bore, said sealing member having a radially extending seating surface on the side thereof toward an opposite end of the said body, a spring-biased valve member resiliently urged toward said seating surface to sealingly engage the sealing member and close said bore, said valve member having a protruding portion extending into said bore to be engaged by the forward end of a said male connecting member whereby the valve member is moved to open position away from said seating surface upon insertion of a male connecting member into said bore, said sealing member being frictionally engageable by said male connecting member inserted in said bore from said first end to resiliently urge said sealing member away from said first end and radially inward of said bore thereby to increase the sealing engagement of the sealing member and male connecting member.

6. In a coupling member adapted to receive a male connecting member, the combination of a hollow body having a central opening extending therethrough, said body having an inner annular shoulder disposed around the axis of the body and inclined at an angle toward the axis and toward a first end of the body, said shoulder defining an inner bore through which the male connecting member may be inserted, an annular sealing member of resilient rubber-like material disposed in said body concentric with said body and adjacent said shoulder, said sealing member being normally inclined radially inward and toward said first end of the body, said sealing member having a cylindrical bore having a diameter less than the diameter of the said inner bore, the said sealing member upon the outer wall of a male connecting member being inserted therein from through said inner bore being resiliently tiltable by the male connecting member toward a flat plane normal to said axis to distortably diminish said cylindrical bore, the sealing member upon being tilted to diminish said cylindrical bore increasing the sealing engagement between the sealing member and said male connecting member, a valve member positioned in said body and biased to be urged in abutting engagement with the side of said sealing member facing an opposite end of the body to control flow of fluid through said cylindrical bore of the sealing member, the valve member biased against said sealing member urging the sealing member toward said shoulder, said valve member having a projecting portion aligned with said cylindrical bore to be engaged by a male connecting member inserted in said cylindrical bore, the male connecting member upon being inserted into said cylindrical bore simultaneously moving the valve member away from the sealing member to open said cylindrical bore and tilting the sealing member to increase the sealing engagement between the sealing member and inserted male connecting member.

7. In a coupling member adapted to receive a male connecting member, the combination of an annular cup-shaped resilient sealing member axially positioned in the coupling member and having an axially extending cylindrical bore therein providing communication for flow of fluid through the coupling member, said sealing member being disposed on an incline extending radially inward and axially toward the open end of the coupling member through which a male connecting member is inserted, said sealing member having a cylindrical bore into which said male connecting member may be inserted, and a spring-biased valve member adapted to engage around the periphery of said cylindrical bore the side of the sealing member away from said open end to close said cylindrical bore, the bias of the valve member against the sealing member urging the sealing member toward said inclined disposition, the inner wall of said cylindrical bore being adapted to frictionally engage a male connecting member inserted therein, the combination of the sealing member and valve member being such that a male connecting member inserted into said cylindrical bore moves the valve away from the sealing member to open said cylindrical bore and tilts said sealing member from said inclined disposition toward a flat plane to diminish the cylindrical bore of the sealing member and thereby to increase the sealing engagement between the male connecting member and the sealing member.

References Cited in the file of this patent

UNITED STATES PATENTS

| | | |
|---|---|---|
| 1,875,679 | Thompson | Sept. 6, 1932 |
| 2,102,774 | Williams | Dec. 21, 1937 |
| 2,131,271 | Coles et al. | Sept. 27, 1938 |
| 2,265,267 | Cowles | Dec. 9, 1941 |
| 2,278,580 | Coles et al. | Apr. 7, 1942 |
| 2,344,739 | Shaff | Mar. 21, 1944 |
| 2,459,477 | Van Schuyver | Jan. 18, 1949 |
| 2,461,818 | Hague | Feb. 15, 1949 |
| 2,744,770 | Davidson et al. | May 8, 1956 |
| 2,761,469 | Hansen | Sept. 4, 1956 |